US008218182B2

(12) United States Patent
Otake et al.

(10) Patent No.: US 8,218,182 B2
(45) Date of Patent: Jul. 10, 2012

(54) IMAGE FORMING APPARATUS PERFORMING IMAGE FORMATION SUITABLE FOR ADDING INFORMATION IN HANDWRITING OR THE LIKE

(75) Inventors: Toshihiko Otake, Ikeda (JP); Kazumi Sawayanagi, Itami (JP); Hideyuki Matsuda, Suita (JP); Hiroki Tajima, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 678 days.

(21) Appl. No.: 12/362,771

(22) Filed: Jan. 30, 2009

(65) Prior Publication Data

US 2009/0303503 A1    Dec. 10, 2009

(30) Foreign Application Priority Data

Jun. 10, 2008   (JP) ................. 2008-152088

(51) Int. Cl.
*G06F 3/12*    (2006.01)
(52) U.S. Cl. ........ 358/1.15; 358/1.9; 358/1.13; 358/442
(58) Field of Classification Search ............... 358/1.15, 358/1.13, 1.9
See application file for complete search history.

(56) References Cited

U.S. PATENT DOCUMENTS

| | | | | |
|---|---|---|---|---|
| 6,154,286 A * | 11/2000 | Konno et al. | ................ | 358/1.13 |
| 6,412,897 B1 * | 7/2002 | Konishi et al. | .................. | 347/14 |
| 6,873,427 B1 * | 3/2005 | Matsuda et al. | ............. | 358/1.15 |
| 6,950,200 B1 * | 9/2005 | Yamada et al. | ............. | 358/1.13 |
| 6,977,735 B1 * | 12/2005 | Ookuma | ...................... | 358/1.13 |
| 7,207,735 B2 * | 4/2007 | Narusawa et al. | .............. | 400/76 |
| 7,259,874 B2 * | 8/2007 | Nishikawa et al. | ............ | 358/1.1 |
| 7,265,863 B2 * | 9/2007 | Ookuma | ...................... | 358/1.15 |
| 7,379,198 B1 * | 5/2008 | Ishida | .......................... | 358/1.15 |
| 7,474,430 B2 * | 1/2009 | Onuma et al. | ............... | 358/1.15 |
| 7,502,049 B2 * | 3/2009 | Aichi et al. | ................ | 348/207.2 |

(Continued)

FOREIGN PATENT DOCUMENTS

JP        10-143414        5/1998

(Continued)

OTHER PUBLICATIONS

Notice of Grounds of Rejection issued in the corresponding Japanese Patent Application No. 2008-152088 dated Apr. 20, 2010, and an English Translation thereof.

*Primary Examiner* — Negussie Worku
(74) *Attorney, Agent, or Firm* — Buchanan Ingersoll & Rooney PC

(57) ABSTRACT

When a printing mode is designated by user operation, an MFP embeds information specifying a storage location in designated stored image data and prints the resultant image data. When a user adds information in handwriting or the like to the above-described printing material, and the printing material after the information is added is scanned, the MFP specifies the storage location from the image data, which is scanned data, and replaces the image data in the above-described storage location by the scanned image data and registers the resultant image data. At the time of the above-described printing, even if the printing condition is set for the image data, the designation of the above-described printing mode allows the printing condition suitable for scanning the printing material to be set.

14 Claims, 12 Drawing Sheets

U.S. PATENT DOCUMENTS

| | | | |
|---|---|---|---|
| 7,595,903 B2 * | 9/2009 | Kizaki et al. | 358/1.15 |
| 7,649,451 B2 * | 1/2010 | Yoshida | 340/525 |
| 7,710,467 B2 * | 5/2010 | Ikeda | 348/231.5 |
| 7,856,202 B2 * | 12/2010 | Mizobuchi et al. | 399/389 |
| 7,903,269 B2 * | 3/2011 | Nakagawa et al. | 358/1.14 |
| 7,903,275 B2 * | 3/2011 | Ishida | 358/1.15 |
| 2004/0062562 A1 * | 4/2004 | Nakatani et al. | 399/82 |

FOREIGN PATENT DOCUMENTS

| | | |
|---|---|---|
| JP | 2002-290749 | 10/2002 |
| JP | 2002-366928 A | 12/2002 |
| JP | 2005-176086 A | 6/2005 |
| JP | 2005-176087 A | 6/2005 |
| JP | 2006-186923 A | 7/2006 |
| JP | 2007-122210 | 5/2007 |

\* cited by examiner

FIG. 6

| IMAGE NO. | Nin1 | NO. OF COLORS | STAPLING | PUNCHING | ONE-SIDE/BOTH-SIDE | TRAY |
|---|---|---|---|---|---|---|
| 2007010001 | 2in1 | COLOR | INVALID | VALID | ONE-SIDE | TRAY 1:HIGH-QUALITY PAPER |
| 2007010002 | 1in1 | MONOCHROME | INVALID | (NO DESIGNATION) | (NO DESIGNATION) | (NO DESIGNATION) |
| 2007010003 | (NO DESIGNATION) | (NO DESIGNATION) | (NO DESIGNATION) | (NO DESIGNATION) | (NO DESIGNATION) | (NO DESIGNATION) |
| 2007020001 | 2in1 | TWO-COLOR (RED) | (NO DESIGNATION) | (NO DESIGNATION) | (NO DESIGNATION) | (NO DESIGNATION) |
| 2007020002 | 4in1 | (NO DESIGNATION) | VALID | INVALID | BOTH-SIDE | TRAY 3: BACKING PAPER |
| ... | ... | ... | ... | ... | ... | ... |

FIG. 7

| USER NAME | Nin1 | NO. OF COLORS | STAPLING | PUNCHING | ONE-SIDE/BOTH-SIDE | TRAY |
|---|---|---|---|---|---|---|
| AAAAA | 2in1 | MONOCHROME | INVALID | VALID | BOTH-SIDE | TRAY 1: HIGH-QUALITY PAPER |
| BBBBB | 1in1 | COLOR | INVALID | INVALID | ONE-SIDE | TRAY 3: BACKING PAPER |
| ... | ... | ... | ... | ... | ... | ... |

FIG. 8

| | NO. OF COLORS | STAPLING | PUNCHING | ONE-SIDE/ BOTH-SIDE | TRAY |
|---|---|---|---|---|---|
| Nin1 | | | | | |
| 1in1 | INVALID | INVALID | INVALID | ONE-SIDE | TRAY 1:HIGH- QUALITY PAPER |

FIG. 11

| IMAGE NO. | Nin1 | NO. OF COLORS | STAPLING | PUNCHING | ONE-SIDE/BOTH-SIDE | TRAY |
|---|---|---|---|---|---|---|
| 2007010001 | 2in1 | COLOR | INVALID | VALID | ONE-SIDE | TRAY 1: HIGH-QUALITY PAPER |
| 2007010002 | 1in1 | MONOCHROME | INVALID | VALID | BOTH-SIDE | TRAY 1: HIGH-QUALITY PAPER |
| 2007010003 | 2im1 | MONOCHROME | INVALID | VALID | BOTH-SIDE | TRAY 1: HIGH-QUALITY PAPER |
| 2007020001 | 2in1 | TWO-COLOR (RED) | INVALID | VALID | BOTH-SIDE | TRAY 1: HIGH-QUALITY PAPER |
| 2007020002 | 4in1 | MONOCHROME | VALID | INVALID | BOTH-SIDE | TRAY 3: BACKING PAPER |
| ... | ... | ... | ... | ... | ... | ... | though the user adds information to the stored image data by easy opera-
IMAGE FORMING APPARATUS PERFORMING IMAGE FORMATION SUITABLE FOR ADDING INFORMATION IN HANDWRITING OR THE LIKE This application is based on Japanese Patent Application No. 2008-152088 filed with the Japan Patent Office on Jun. 10, 2008, the entire content of which is hereby incorporated by reference.

BACKGROUND OF THE INVENTION

1. Field of the Invention

This invention relates to an image forming apparatus, an image forming method, and a storage medium that stores an image forming program, and particularly to an image forming apparatus that performs image formation suitable for adding information to an original after image formation in handwriting or the like, an image forming method therefore, and a storage medium that stores an image forming program.

2. Description of the Related Art

A storage device may be incorporated in an image formation device such as an MFP (Multi Function Peripheral) including a printing function and a scanning function, and may store image data. Alternatively, when the image forming apparatus is connected to a network, image data may be stored in a storage device connected to the image forming apparatus through the network. In such a case, the user can print the stored image data by the image forming apparatus to use in various ways.

As one of usages of the stored image data, a usage in which new information is added to the stored image data, or part of the stored image data is changed is cited. For example, in Japanese Laid-Open Patent Publication No. 2005-176086 and Japanese Laid-Open Patent Publication No. 2005-176087, there is disclosed an image forming apparatus that prints only one copy of stored image data with identification information added in order for a user to check an output condition. In the image forming apparatus disclosed in these documents, after the output condition is changed, and the image data with the above-described identification information added is scanned, the scanned data is subjected to image formation processing based on the changed output condition so that based on the identification information, the stored image data is replaced. Moreover, for example, in Japanese Laid-Open Patent Publication No. 2006-186923 applied and published by the present applicant, there is disclosed an image forming apparatus that associates a handwritten letter added after image formation and image data before the image formation on a basis of person In the image forming apparatus disclosed in this document, first image data, which has been stored, is printed, and an original on which the relevant image data is printed is scanned, and thereafter, additional image such as a handwritten letter or the like is extracted from second image data as scanned data, so that inputted user identification information, the extracted additional image and the first image data are associated and stored. Moreover, for example, in Japanese Laid-Open Patent Publication No. 2002-366928 applied and published by the present applicant, an image processing system for document registration capable of replacing and inserting only a changed or added area in a registered document file is disclosed.

As one of usages of the foregoing stored image data is also cited a usage in which a user adds information such as handwriting and a stamp to an original on which the image data is printed, and the stored image data is updated by image data obtained by scanning the original with the information added.

However, although there are needs for these usages, whichever technique disclosed in the above-described documents is used, image formation suitable for the above-described usages cannot be realized by easy operation.

SUMMARY OF THE INVENTION

In light of the above-described problem, the present invention is achieved, and an object thereof is to provide an image forming apparatus that performs image formation suitable for adding information to stored image data by a user by easy operation, an image forming method therefore, and a storage medium that stores an image forming program.

In order to achieve the above-described object, according to one aspect of the present invention, an image forming apparatus includes a designating unit that receives designation of image data to be processed, a receiving unit that receives a mode for printing the image data to be processed, a setting unit that sets a printing condition on which the image data to be processed is printed, and a print unit that prints the image data to be processed on the set printing condition, wherein when the receiving unit receives the mode of printing for use in replacing image data stored in a storage device by image data obtained by scanning an original after the printing, the setting unit sets the printing condition associated with the mode in advance.

According to another aspect of the present invention, an image forming method includes the steps of receiving designation of image data to be processed, receiving a mode for printing the image data to be processed, setting a printing condition on which the image data to be processed is printed, and printing the image data to be processed on the set printing condition, wherein, when in the step of receiving the mode for printing the image data to be processed, the mode of printing for use in replacing image data stored in a storage device by image data obtained by scanning an original after the printing is received, in the step of setting the printing condition, the printing condition associated with the mode in advance is set.

According to still another aspect of the present invention, a storage medium for storing an image forming program stores the program for causing a computer included in an image forming apparatus provided with a printer to execute printing, the program causing the computer to execute the steps of receiving designation of image data to be processed, receiving a mode for printing the image data to be processed, setting a printing condition on which the image data to be processed is printed, and printing the image data to be processed on the set printing condition in the printer, wherein, when in the step of receiving the mode for printing the image data to be processed, the mode of printing for use in replacing image data stored in a storage device by image data obtained by scanning an original after the printing is received, in the step of setting the printing condition, the printing condition associated with the relevant mode in advance is set.

According to this invention, the use of the image forming apparatus allows the user to perform image formation suitable for adding information to the stored image data by easy operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6 to 8 are diagrams each showing a specific example of a printing condition.

FIG. 11 is a diagram showing a specific example of the printing condition.

DESCRIPTION OF THE PREFERRED EMBODIMENTS

Figure 1:
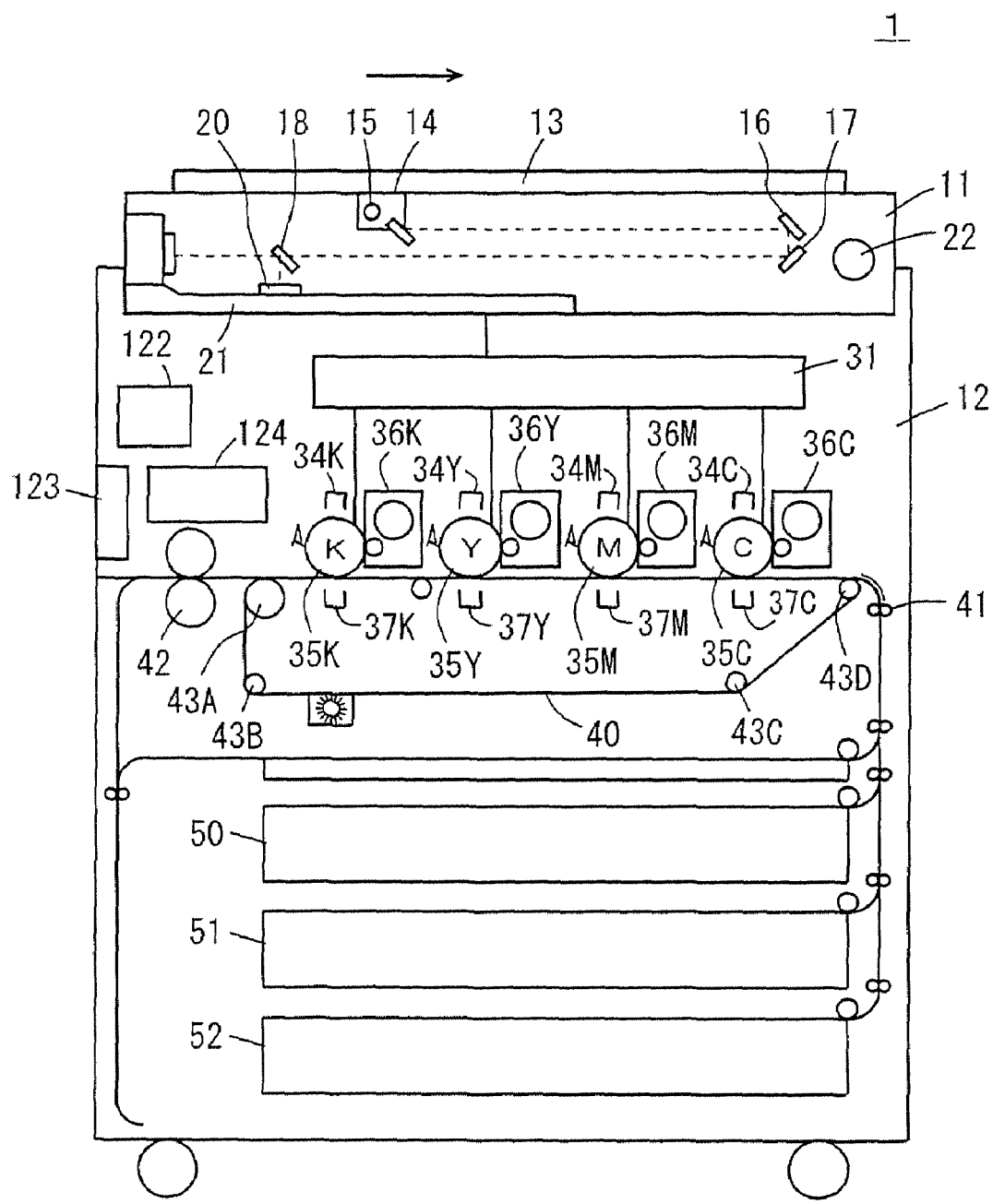
FIG. 1 is a schematic cross-sectional diagram showing a schematic configuration of an MFP according to an embodiment.

Hereinafter, referring to the drawings, embodiments of the present invention are described. In the following description, the same reference numerals are given to the same components and configuration elements. This is applied to names and functions thereof.

Referring to FIG. 1, an MFP (Multi Function Peripheral) 1 in an embodiment of the present invention has a scanner unit 11 that reads image data from an original, a print unit 12 that prints an image on paper, an operation panel 122 that is an interface with a user, a network interface (I/F) 123 for performing communication with another apparatus through a network, and a storage unit 124 that stores image data, data accompanying the relevant image data and the like.

The original placed on an original platen 13 of scanner unit 11 is irradiated with an exposure lamp 15 included by scanner 14. Scanner 14 moves in an arrow direction by a scanner motor 22 to scan the whole original. Reflected light from a surface of the original forms an image on a CCD (Charge Coupled Device) 20 through mirrors 16 to 18 and a collecting lens. CCD 20 converts the reflected light from the surface of the original to color data (analog signal) of RGB and outputs the same to a scanner controller 21. The color data that CCD 20 outputs to scanner controller 21 is referred to as image data.

Scanner controller 21 applies predetermined image processing to the image data inputted from CCD 20 to output digital signals to a print controller 31. The digital signals outputted from scanner controller 21 to print controller 31 are image color data C for cyan, image color data M for magenta, image color data Y for yellow, and image color data K for black. Print controller 31 outputs laser beams to respective photoreceptor drums 35C, 35M, 35Y, 35K of cyan, magenta, yellow and black, based on the inputted image color data C, M, Y and K.

In print unit 12, the laser beams outputted from scanner controller 21 expose photoreceptor drums 35C, 35M, 35Y, 35K charged by electrifying chargers 34C, 34M, 34Y, 34K to form electrostatic latent images. The electrostatic latent images on photoreceptor drums 35C, 35M, 35Y, 35K are developed by developers 36C, 36M, 36Y, 36K for the four colors of cyan, magenta, yellow and black.

An endless belt 40 is suspended by a driving roller 43A, fixed rollers 43B, 43C, 43D in such a manner that it does not sag. When driving roller 43A rotates counterclockwise in the figure, endless belt 40 rotates at a predetermined speed counterclockwise in the figure.

Appropriate paper is fed from paper feed trays 50 to 52, and the paper is supplied from a timing roller 41 to endless belt 40. The paper supplied to endless belt 40 is carried on endless belt 40 to be fed in a left direction in the figure. This brings the paper into contact with photoreceptor drums 35C, 35M, 35Y, 35K in an order of cyan, magenta, yellow and black When the paper is brought into contact with respective photoreceptors drums 35C, 35M, 35Y, 35K, toner images developed on the photoreceptor drums are transferred to the paper by transfer chargers 37C, 37M, 37Y, 37K, which are paired with the respective photoreceptor drums.

The paper on which the toner images have been transferred is heated by a pair of fuser rollers 42. Thereby, toner is fused and fixed on the paper. Thereafter, the paper is discharged from print unit 12.

Storage unit 124 is made up of a hard disk, a RAM (Random Access Memory) and the like, which are not shown in the figure. Moreover, a storage area called BOX that is associated on a user basis or on a group basis, and to which an access right is set may be included. Image data stored in storage unit 124 is subjected to image formation in print unit 12 and printed on the paper similarly to the image data obtained by reading the original by scanner unit 11.

Moreover, in addition to the foregoing image reading function, image forming function, printing function of printing data, and file accumulating function, MFP 1 includes an electronic mail transmitting and receiving function, file transfer function, facsimile transmitting and receiving function as functions of transmitting and receiving data with respect to another apparatus through network I/F 123.

Figure 2:
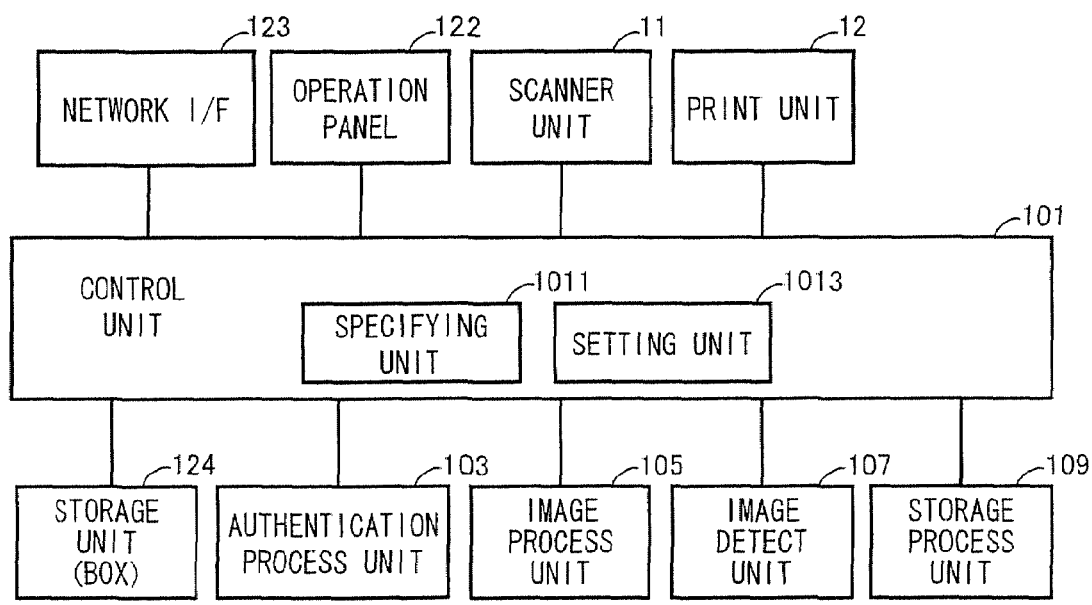
FIG. 2 is a block diagram showing an outline of a control configuration of the MFP according to the embodiment.

Referring to FIG. 2, a control configuration of MFP 1 includes a control unit 101 connected to above-described scanner unit 11, print unit 12, network I/F 123 and storage unit 124 to control them, an authentication process unit 103, an image process unit 105, an image detect unit 107, and a storage process unit 109 further connected to control unit 101. Furthermore, control unit 101 includes a specifying unit 1011 and a setting unit 1013. Each of these functions is mainly configured on a CPU (Central Processing Unit) not shown by the CPU reading a program stored in a ROM (Read Only Memory), the RAM or the like to execute the program in accordance with an operation signal inputted from another apparatus through operation panel 122 or network I/F 123. Moreover, at least part thereof may be configured by hardware shown in FIG. 1.

Control unit 101 is made up of the CPU, the ROM, the RAM and the like not shown. Control unit 101 outputs a control signal to scanner unit 11 and print unit 12 based on the operation signal from operation panel 122 or the like to realize the foregoing image reading function, image forming function and printing function. Moreover, control unit 101 communicates with storage unit 124 realizing the file accumulating function to read predetermined image data from storage unit 124, and to store image data or the like read by scanner unit 11 in storage unit 124. Control unit 101 further outputs the control signal to authentication process unit 103, image process unit 105, image detect unit 107, and storage process unit 109 based on the operation signal from operation panel 122 and the like.

Authentication process unit 103 performs authentication processing using user information inputted from operation panel 122 or the like in accordance with the control signal from control unit 101 to specify and authenticate the user who is performing the operation. The user information corresponds to a user name, a password, and the like. The authentication processing performed by authentication process unit 103 is not limited to specific processing. For example, there is cited processing in which user information of the user permitted the operation is stored in advance, and inputted user information and the stored user information are compared to extract consistent user information and thereby specify the relevant user, and further, the relevant user is authenticated as the user permitted the operation. Information indicating an authentication result is inputted to control unit 101 from authentication process unit 103. Control unit 101 determined whether or not to execute behaviors by scanner unit 11, behaviors by print unit 12 and the like, based on the authentication result. Moreover, based on the authentication result, control unit 101 determines whether or not the storage of the image data in storage unit 124, the reading of the image data from storage unit 124 or the like is permitted. Control unit 101 outputs the control signal in accordance with the result.

Scanner unit 11 scans the original placed on original platen 13 by operating scanner 14 and the like in accordance with the control signal from control unit 101 to generate image data. The generated image data is stored in the predetermined area of storage unit 124 by control unit 101 based on the operation signal from operation panel 122 or the like. Alternatively, image data that has been already stored in a location on storage unit 124 specified by specifying unit 1011 described later is replaced by the above-described data to store the relevant data on storage unit 124.

Setting unit 1013 included in control unit 101 sets a condition for printing designated image data among the image data stored in storage unit 124, based on information accompanying the image data, the operation signal from operation panel 122 and the like. This condition is referred to as a "printing condition" in the following description. For the printing condition, several items are cited. As one of the items, for example, in the case where the image data is configured in pages, a number of pages to be printed on one piece of paper is cited. The printing of a plurality of pages on one piece of paper is referred to as Nin1-printing, and an image subjected to the Nin1-printing may be referred to as an Nin1-image or the like. Moreover, as other items of the printing condition, for example, there are cited a number of colors to be printed (monochrome (single-color), two-color, etc.), whether to perform one-side printing or both-side printing, from which of paper feed trays 50 to 52 the printing paper is to be supplied, and so on. As described later, in print unit 12, validity/invalidity of a function of performing processing for the paper after printing (referred to as post-processing) such as stapling processing and punching processing may be set as the printing condition, although it is not shown in FIG. 1. In this case, the item of the "printing condition" also includes the processing for the paper after printing. For example, whether or not the stapling processing is to be performed, whether or not the punching processing is to be performed and so on, correspond to the "printing condition" as the condition of the processing for the paper after printing.

Image process unit 105, in accordance with the control signal from control unit 101, performs the image processing on the printing condition set in setting unit 1013 for the designated image data among the image data stored in storage unit 124. Furthermore, in accordance with the control signal from control unit 101, image process unit 105 performs image processing in which at least information specifying a storage location of the image data, for example, information indicating an address on storage unit 124 is set as woven pattern information, and a woven pattern based on the relevant woven pattern information is embedded in the image data stored in storage unit 124. As described before, in the case where the image data is configured in pages, the woven pattern indicating the address of a relevant page on storage unit 124 may be embedded in each of the pages of the image data As a result of the image processing, image data for printing on the paper is generated. The image data resulting from the image processing is inputted to control unit 101.

Print unit 12 prints the image data resulting from the image processing in image process unit 105 on the paper on the printing condition set in setting unit 1013 in accordance with the control signal from control unit 101. As described before, the function of performing the post-processing may be included in print unit 12. In this case, print unit 12, in accordance with the control signal from control unit 101, applies the post-processing to the printed paper in accordance with the "printing condition" as the condition of the processing for the paper after printing, which has been set by setting unit 1013.

Image detect unit 107 extracts the woven pattern embedded from image data obtained by scanning in scanner unit 11 in accordance with the control signal from control unit 101 to input the woven pattern information indicating the woven pattern to control unit 101.

Specifying unit 1011 included in control unit 101 specifies the address on storage unit 124 of the image data obtained by scanning, based on the woven pattern information inputted from image detect unit 107.

First Embodiment

Figure 3:
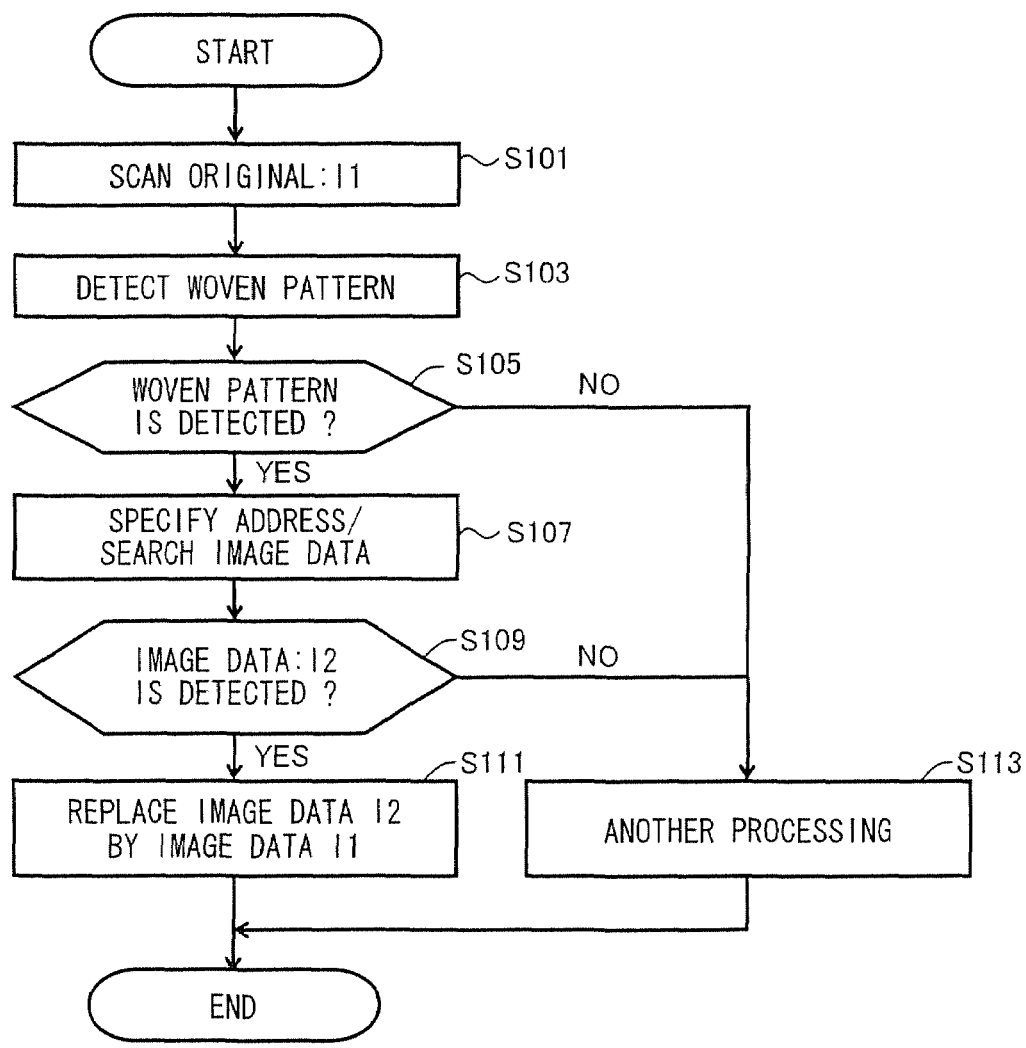
FIG. 3 is a flowchart showing a specific example of a flow of registration processing of image data executed in the MFP according to the embodiment.

FIG. 3 is a flowchart showing a specific example of a flow of registration processing of image data executed in an MFP in the present embodiment. The processing shown in the flowchart of FIG. 3 is started when an original is placed on original platen 13 and an instruction for starting the scanning is made in operation panel 122. The CPU (not shown) of MFP 1 reads and executes the program stored in the ROM or the like, and controls the respective parts shown in FIG. 2, by which the processing shown in the flowchart of FIG. 3 is realized.

Referring to FIG. 3, in step S101, in accordance with a condition specified in operation panel 122, the original placed on original platen 13 is scanned in scanner unit 11 to thereby acquire image data I1. In step S103, in image detect unit 107, processing for detecting a woven pattern image from image data I1 obtained in step S101 is executed.

As a result of the processing in step S103, if the woven pattern image is detected from image data I1 obtained in step S101 (YES in step S105), in step S107, in specifying unit 1011, an address on storage unit 124 from the woven pattern image detected in step S103 is specified. Then, whether or not image data is present at the address is searched by control unit 101.

As a result of the searching in step S107, if image data I2 is detected from the address on storage unit 124 specified from the detected woven pattern image (YES in step S109), in step S111, control unit 101 replaces the image data I2 stored at the above-described address by image data I1 obtained in step S101 to store image data I1 in a location indicated by the above-described address of storage unit 124.

As a result of above-described step S103, if the woven pattern image is not detected from image data I1 obtained in step S101 (NO in step S105), if the address is not specified from the woven pattern image by specifying unit 1011 in step S107, or if the image data is not detected at the address specified in step S107 (NO in step S109), in step 113, MFP 1 executes another processing for image data I1 obtained in step S101. As the other processing, for example, processing for storing image data I1 in a location indicated by an address inputted when scanning is cited.

Figure 4:
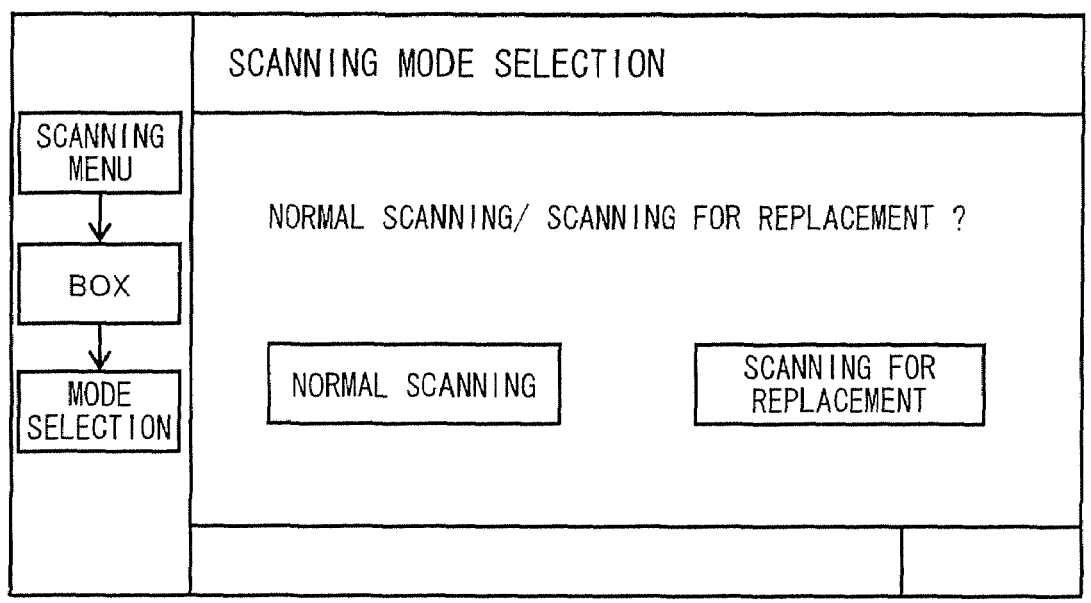
FIG. 4 is a diagram showing a specific example of a screen displayed in the MFP according to the embodiment.

The processing shown in FIG. 3, if in above-described step S103, the woven pattern is detected from image data I1 obtained in step S101, and further if in step S107, image data I2 is detected at the address specified from the above-described woven pattern, the processing for replacing image data I2 by image data I1 is performed in step S111. However, when the execution of scanning is instructed prior to the start of the processing of FIG. 3, a screen of FIG. 4 may be displayed on operation panel 122 so as to receive selection as to whether it is a scanning instruction for performing the above-described replacement. In the example of FIG. 4, the scanning for performing the above-described replacement is referred to as "scanning for replacement", and otherwise, the scanning in a normal manner is referred to as "normal scanning".

Figure 5:
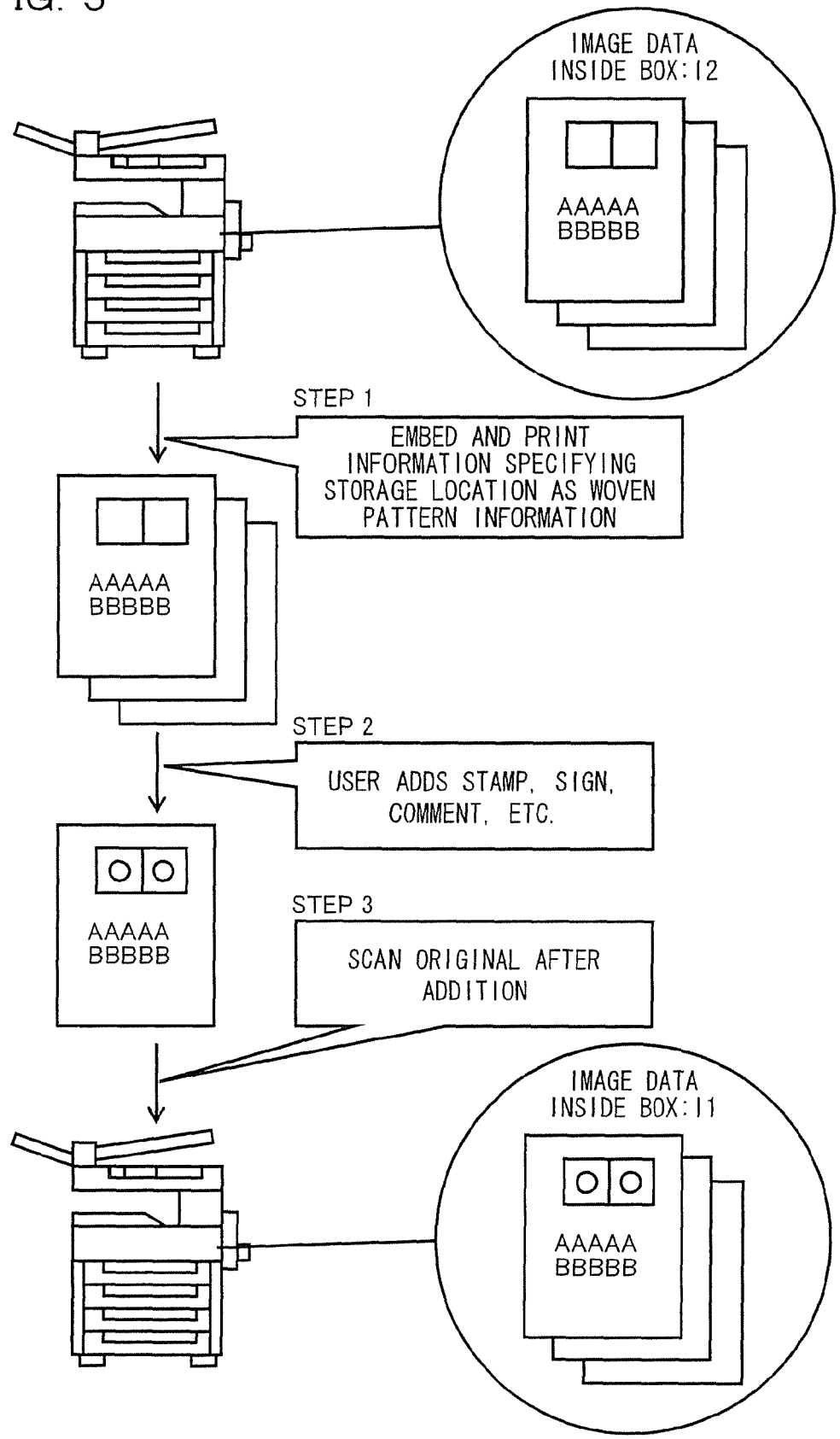
FIG. 5 is a diagram illustrating a specific example of a usage of the MFP according to the embodiment.

When the start of scanning is instructed in the MFP according to the present embodiment, the above-described processing is performed, which enables a usage of the MFP illustrated in FIG. 5 by the user. That is, referring to FIG. 5, it is assumed that image data I2 is stored in a predetermined area (e.g., area called BOX or the like) of storage unit 124 of MFP 1. The user causes MFP 1 to embed the information specifying the storage location as the woven pattern image in image data I2 and to print the resultant image (STEP 1). The user performs addition of information such as stamping, signing and describing a comment to the foregoing printing material (STEP 2). The printing material after the information is added is scanned by MFP 1 (STEP 3). By the user instructing the operation in STEP 3, that is, by placing, on original platen 13, the printing material after the information is added to instruct the start of scanning on operation panel 122, the foregoing processing shown in FIG. 3 is executed in MFP 1. That is, the foregoing processing allows image data I2 stored in storage unit 124 of MFP 1 to be replaced by image data I1 obtained by scanning the printing material after the foregoing information is added. Thereby, by easy operation, the user can replace image data (I2) stored in MFP 1 by new image data (I1) in which the handwriting information such as a sign is added. As described before, in the case where the image data is configured in pages, the information specifying the storage location for each page is embedded as the woven pattern image in STEP 1. If the user adds the information to only a certain page in the printing material in STEP 2, the user causes only the page with the information added thereto to be scanned in STEP 3. Thereby, for only the image data of the page with the information added thereon, the replacement is performed, the resultant image data is registered in the image data stored in MFP 1.

[Modification]

When image data is printed in the MFP, the printing may be performed on the various printing conditions as described before. For example, in the case where the image data is configured in pages, the image data of a plurality of pages may be printed on one piece of paper, that is, Nin1-printing may be performed. At this time, when handwriting information such as a sign is added to the printing material and scanned, stored image data is replaced by image data obtained by scanning an original subjected to the Nin1-printing, and the resultant image data is registered. This may make a size of the handwriting information small when the relevant image data is printed.

Consequently, in the MFP in a modification, storage process unit 109 applies image processing to the relevant image data when the image data obtained by scanning is registered. Storage process unit 109, in accordance with the control signal from control unit 101, performs image processing for putting the image data obtained by scanning into the same state as, or into a state close to that of the image data stored in a location on storage unit 124 specified in specifying unit 1011. Control unit 101 stores the image data after the processing in storage process unit 109 in the location on storage unit 124 specified by specifying unit 1011. For example, as described before, in the case of the image data obtained by scanning the original subjected to the Nin1-printing, storage process unit 109 performs processing for converting the size of the image data to the same size as that in the case where image data of one page is printed on one piece of paper, as in the image data stored in the location on storage unit 124. Moreover, for example, if the original is placed on original platen 13 in an inclined manner and the like and scanned, resulting in inclined image data, storage process unit 109 performs processing for correcting the inclination of the image data. Contents of the image processing may be determined by storage process unit 109 comparing the image data obtained by scanning and the image data stored in the location on storage unit 124 specified in specifying unit 1011. For example, in the case of the former image processing example, both the pieces of image data are compared in size to find a size ratio so that the processing for converting the size is performed, and an amount of expansion (or contraction) is determined. Moreover, in the case of the latter image processing example, both the pieces of image data are compared to find an inclination amount so that the processing for correcting the inclination is performed, and a correction amount (inclination amount) is determined.

Alternatively, when the image data stored in storage unit 124 is printed, image process unit 105 may perform image processing for embedding, in the image data, a woven pattern based on woven pattern information in which information indicating the printing condition is set in addition to the information specifying the storage location. At this time, storage process unit 109 may extract the printing condition from the woven pattern information indicating the woven pattern detected in image detect unit 107 and determine the contents of the image processing based on the printing condition.

By performing the foregoing processing in the MFP according to the modification of the present embodiment, by easy operation, the user can replace image data (I2) stored in MFP 1 by new image data (I1) in which the handwriting information such as a sign is added, while preventing the state of portions included in previous image data (I2) from being impaired as much as possible.

Second Embodiment

As described above, when the image data is printed in the MFP, the printing may be performed on the various printing conditions as described before. Thus, when the printed original is scanned and subjected to the foregoing processing, the following problem may arise.

When handwritten information such as a sign is added to an original subjected to the Nin1-printing and then scanned, and further the size of obtained image data (I1) is converted to the same size as that of stored image data (I2), the size of the added information is also converted Accordingly, in image data (I1), which has been obtained by the replacement and registered, the size of the added information becomes different from the information when the user added.

Similarly, in the case where information is added to an original on which full-color image data has been printed monochromatically and the resultant is scanned, the foregoing processing causes the stored full-color image data to be replaced by the monochrome image data, so that the monochrome image data is registered. Also, in the case where the punching processing is performed to paper after printing, image data is replaced by image data with a punching mark or image data in which part of information is lost by the punching, and the resultant image data is registered. In the case where the printing is performed on low-quality paper, or on a back side of paper on which another information has been already printed (referred to as backing paper), the image data can also be replaced by image data affected by a texture of the paper, the information on the back side or the like, and the resultant image data may be disadvantageously registered.

Consequently, besides a normal printing mode, as a printing mode, an MFP in a second embodiment includes a mode in which a printing material for use in adding handwriting information such as a sign is printed. The former printing mode is referred to as a "normal mode", while the latter printing mode is referred to as a "handwriting mode".

Here, the foregoing printing condition is described.

When an original is scanned and so on to generate image data, the printing condition of the image data may be generated, for example, by an application for generating the image data. Information indicating the printing condition generated when the image data is generated accompanies the image data, and is stored in storage unit 124. "Accompanying" may mean being included in one file together with the image data, may mean being included in part of the image data such as a header part of the image data, or may mean being stored as a different file or different data from the image data in association with the image data. "The printing condition generated when the image data is generated" does not need to be generated at the same timing as the timing when the image data is generated, but for example, may be generated based on information inputted when the user instructs the scanning on operation panel 122 or the like, information inputted by operation for causing the image data obtained by scanning to be stored in storage unit 124 and so on. Moreover, after being stored in storage unit 124, the generated printing condition may be changed by predetermined operation by the user, or the like.

FIG. 6 shows a specific example of the printing condition accompanying the image data, and generated when the image data is generated. In the example of FIG. 6, the printing condition is stored in storage unit 124 in association with the image data as a file or data different from the image data with information identifying the image data (image number) included therein. Moreover, in the example of FIG. 6, as the printing condition, a condition is defined with respect to respective items of a number of pages to be printed on one piece of paper (Nin1), a number of colors to be printed (No. of colors), whether or not stapling is necessary (stapling), whether or not punching processing is necessary (punching), whether printing is to be performed on one side of paper, or on both sides of paper (one-side/both-side), and a paper feed tray to which the printed paper is to be supplied (tray). The items of the printing condition are not limited to the items shown in FIG. 6, but another item may be included. Moreover, not all the items shown in FIG. 6 may be included. As another item, for example, a magnification is cited. In a similar sense, a paper size may be employed. This is because the magnification is fixed by a ratio between a selected paper size and a size when the image data is outputted.

Furthermore, a printing condition predesignated for the relevant user may be stored FIG. 7 shows a specific example of the printing condition predesignated for the user. In the example of FIG. 7, the printing condition includes information identifying the user (user name and the like), and the printing condition designated for each user is associated. The printing condition predesignated for the user is not limited to the form shown in FIG. 7, but for example, it may be stored in a form associated with another information of the user as the foregoing user information.

In addition to these printing conditions, input of the printing condition is enabled when the printing of the image data is instructed on operation panel 122 or the like. Moreover, a default printing condition is stored in advance.

Furthermore, in the present embodiment, a printing condition in the handwriting mode is also stored in advance. FIG. 8 shows a specific example of the printing condition in the handwriting mode. As shown in FIG. 8, the printing condition in the handwriting mode is a printing condition capable of restraining change in attribute such as the size and the color of the stored image data as much as possible. Moreover, it is a printing condition allowing the printing in a form suitable for the addition of the information such as a sign, and the printing in a form suitable for subsequent scanning to be performed. More specifically, referring to FIG. 8, the printing condition is a condition allowing image data of one page to be printed on one piece of paper instead of performing the Nin1-printing. Moreover, it may be a condition making change in color condition invalid and causing the printing in colors of the image data to be performed. Alternatively, the color condition may be a condition setting colors matching a color format (R (Red) G (Green) B (Blue), YMCK, etc.) of the image data to be printed. These printing conditions correspond to printing conditions capable of restraining change in attribute such as the size and the color of the stored image data as much as possible. That is, they correspond to printing conditions for printing the stored image data in its original state as much as possible. Moreover, the printing condition is a condition making the stapling processing invalid, that is, not allowing the stapling processing to be performed. This condition corresponds to a printing condition allowing the image data to be printed in a form suitable for writing. Moreover, the printing condition is a condition making the punching processing invalid, that is, not allowing the punching processing to be performed. Moreover, it is a condition causing the image data to be printed on one side of the paper instead of being printed on both sides. Moreover, it is a condition causing the printing to be performed on high-quality paper stored in tray 1. These conditions correspond to printing conditions allowing the printing to be performed in a form suitable for scanning.

When the image data is printed, setting unit 1013 reads the printing condition to set the printing condition for the image data. If a plurality of printing conditions exist among the printing condition accompanying the image data designated as a printing object, and the printing condition predesignated for the user performing the printing instruction, the printing condition inputted when the printing instruction is performed, a setting method of the printing condition in setting unit 1013 is not limited to a specific method. As one specific example of the setting method of the printing condition, a method in which the printing condition is set based on a predefined priority order is cited. For example, when the printing condition inputted when the printing instruction is performed is defined as a top priory condition (first priority order), setting unit 1013 sets the printing condition inputted when the printing instruction is performed as the printing condition when the image data is printed, even if the printing condition accompanying the image data or the printing condition predesignated for the user performing the printing instruction exists.

Figure 9:
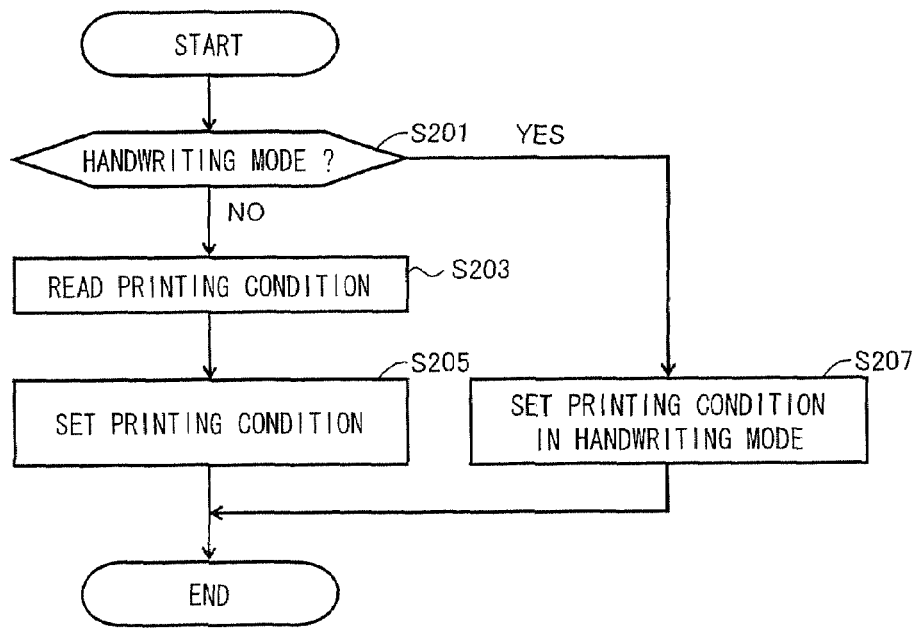
FIG. 9 is a flowchart showing a specific example of a flow of printing processing of image data executed in the MFP according to an embodiment.
Figure 10:
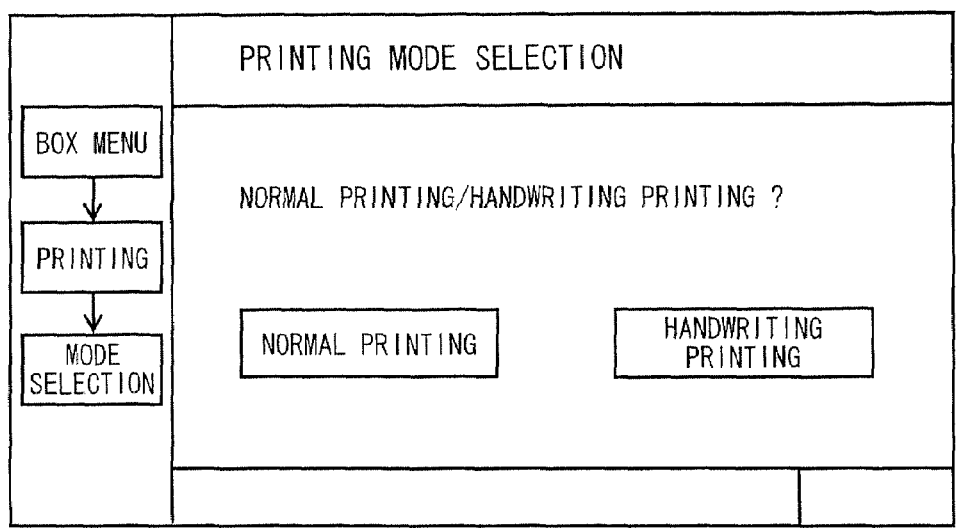
FIG. 10 is a diagram showing a specific example of a screen displayed in the MFP in the embodiment.

FIG. 9 is a flowchart showing a specific example of a flow of printing processing of image data executed in the MFP in the present embodiment. The processing shown in the flowchart of FIG. 9 is started when image data to be printed is designated on operation panel 122 or the like and an instruction of the printing is performed. Specifically, when the image data is designated on operation panel 122 or the like, and the instruction of the printing is given, a screen for selecting the printing mode shown in FIG. 10 is displayed On the screen, the selection of the printing mode between the normal mode and the handwriting mode is received. Once the printing mode is selected, the processing shown in the flowchart in FIG. 9 is started. The processing shown in the flowchart of FIG. 9 is realized by the CPU (not shown) of MFP 1 reading and executing the program stored in the ROM or the like, and controlling the respective parts shown in FIG. 2.

Referring to FIG. 9, in step S201, control unit 101 analyzes an operation signal from operation panel 122 or the like to determine whether the printing mode is the normal mode or the handwriting mode. If it is the normal mode (NO in step S210), in step S203, setting unit 1013 reads the foregoing printing condition from a predetermined area of storage unit 124, and sets the printing condition in step S205.

The setting method in setting unit 1013 in step S205 is not limited to a specific method. For example, as described before, the method of setting the printing condition based on the predefined priority order is cited. For example, as described before, in the case where the printing condition inputted when the printing instruction is performed is defined as the top priority condition (first priority order), setting unit 1013 sets a printing condition as shown in FIG. 11 when the printing condition inputted when the printing instruction is performed, as shown in FIG. 6 and the printing condition predesignated for the user performing the printing instruction as shown in FIG. 7 are read in above-described step S203. Particularly, referring to FIG. 11, in the printing condition shown in FIG. 6, for the item in which the printing condition is not designated as "no designation", the printing condition shown in FIG. 7 is employed, and for the other items, the printing condition designated in FIG. 6 is given priority to be employed.

On the other hand, in the present embodiment, if the printing mode selected in above-described step S201 is determined to be the handwriting mode (YES in step S201), the printing condition in the handwriting mode shown in FIG. 8 is set as the printing condition by setting unit 1013 in step S207, even if the printing condition accompanies the designated image data, or even if the printing condition is preset for the user performing the operation.

As described before, the handwriting printing condition shown in FIG. 8 is a printing condition capable of restraining change in attribute such as the size and the color of the stored image data as much as possible, and is a printing condition allowing the printing in the form suitable for writing and the printing in the form suitable for subsequent scanning to be performed. Therefore, by performing the foregoing processing in the MFP according to the present embodiment, the printing material suitable for the usage in which as shown in FIG. 5, the handwriting information or the like is added to the stored image data after the printing, and the stored image data is replaced by the image data obtained by scanning the original with the information added so as to register the resultant image data, is printed by easy operation.

Specifically, for example, even when 2in1-printing is predefined as the printing condition for the stored image data, or for the user performing the printing operation, by causing the MFP to perform the printing in the handwriting mode, 1in1-printing is executed as the printing condition in the handwriting mode. The size of the image data obtained by scanning after the handwriting information such as a sign is added to this printing material is the same as that of the stored image data. This prevents the size of the added information from being changed when the image data is replaced. Similarly, even when the stored image data is of a color image, and the printing condition of changing the number of colors to monochrome is predefined for the relevant image data or for the user performing the printing operation, by causing the MFP to perform the printing in the handwriting mode, the change in number of colors is made invalid as the printing condition in the handwriting mode, so that the printing in the number of colors of the stored image data, that is, the printing in color is executed Thereby, when the image data is replaced, the color attribute of the stored image data is not lost, that is, the image data of a color image is not replaced by the image data of a monochrome image.

Moreover, the printing in which these types of processing are made invalid is also applied to the stapling processing, the punching processing and the like. Thereby, the stored image data is not replaced by image data having a stapling or punching mark. Moreover, the stored image data is not replaced by image data in which part of information is lost by the punching.

Also, in the selection of the tray used for printing (i.e., paper set on the tray), similarly, the tray on which the high-quality paper is set is selected as the printing condition in the handwriting mode to execute the printing. Thereby, the stored image data is not replaced by image data affected by a texture, information on the back surface and the like of the paper excepting the high-quality paper.

In the above example, the printing condition in the handwriting mode as shown in FIG. 8 is stored in MFP 1 in advance, and the above-described printing condition is selected corresponding to the selection of the printing mode. However, for the processing in MFP 1, the printing condition as shown in FIG. 8 only needs to be consequently set in the printing in the handwriting mode, and the processing is not limited to the above method.

Figure 12:
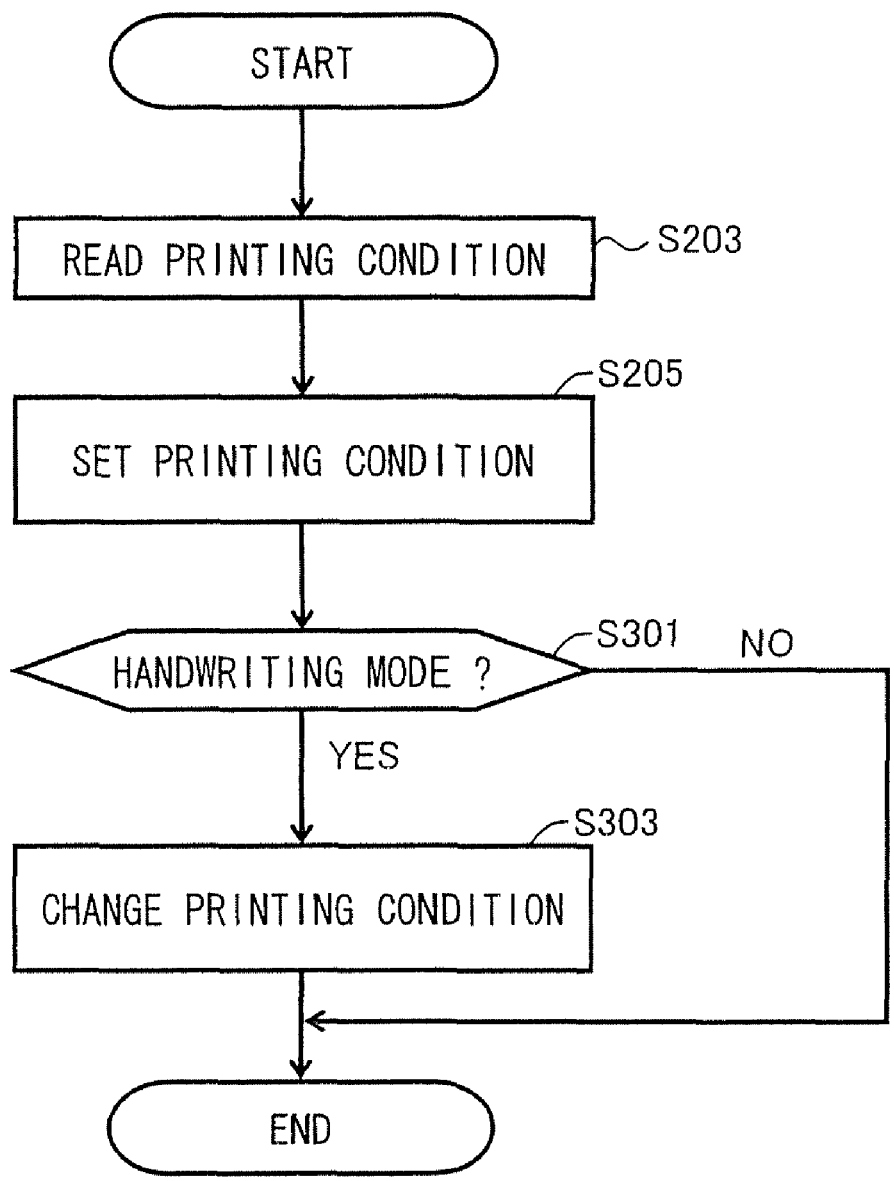
FIG. 12 is a flowchart showing another specific example of the flow of the printing processing of the image data executed in MFP according to the embodiment.

For example, the printing condition in the handwriting mode as shown in FIG. 8 is not stored in advance, and processing in FIG. 12 may be performed in place of the processing in FIG. 9. Particularly, referring to FIG. 12, setting unit 1013 reads the foregoing printing condition from a predetermined area of storage unit 124 in step S203, regardless of the selected printing mode, and the printing condition is set in step S205. Thereafter, in step S301, the control unit 101 analyzes the operation signal from operation panel 122 or the like to determine whether the printing mode is the normal mode or the handwriting mode. If it is the normal mode (NO in step S301), the printing condition set in step S205 is kept as it is. However, if the selected printing mode is the handwriting mode (YES in step S301), in step S303, setting unit 1013 determines whether or not each of the items of the printing condition set in step S205 is appropriate, and changes the printing condition for each of the items as necessary.

As a specific example of the processing in step S303, the following method is cited. The order of determination is not limited to the following. Moreover, determination contents and contents changed as a result of the determination are stored in advance. Particularly, setting unit 1013 first determines whether or not the size of the image data to be printed is changed in the printing condition set in step S205, and if it is changed, the setting is changed to the printing condition without the change. Specifically, among the items of the printing condition set in step S205, whether or not the Nin1-printing is the 1in1-printing is determined, and if it is other than 1in1-printing, the printing condition of the relevant item is changed to the 1in1-printing. Moreover, setting unit 1013 determines whether or not the magnification is 100% among the items of the printing condition set in step S205, and if it is a magnification other than 100%, the magnification is changed to 100%. As described before, in a similar sense, it is determined whether the selected paper size is different from, or the same as the size when the image data is outputted, and if it is different, a change is made so that it is the same size.

Next, setting unit 1013 determines whether or not the color of the image data to be printed is changed in the printing condition set in step S205, and if it is changed, the setting is changed to the printing condition without the change. Specifically, when the image data to be printed is of a color image, setting unit 1013 determines whether or not the number of colors is color among the items of the printing condition set in step S205, and if it is other than color, the setting is changed to color. Alternatively, when the image data to be printed is of a monochrome image, it is determined whether or not the number of color is monochrome among the items of the printing condition set in step S205, and if it is other than monochrome, the setting is changed to monochrome. Preferably, the setting is changed to a condition on which the color form is converted in accordance with a color format (RGB, YMCK, etc.) of the image data to be printed.

Next, setting unit 1013 determines whether or not the post-processing of the image data to be printed is made valid on the printing condition set in step S205, that is, whether or not the printing condition is set so as to perform the post-processing, and if it is made valid, the setting is changed to make it invalid.

Next, setting unit 1013 determines whether or not with the selection of the tray supplying the printing paper, the tray on which the high-quality paper is loaded is selected on the condition set in step S205, that is, whether or not the printing condition is set so as to perform the printing on the high-quality paper, and if it is set to the tray other than the tray on which the high-quality paper is loaded, the setting is changed to the tray on which the high-quality paper is loaded.

By performing the above-described processing, similar to the case where the printing condition in the handwriting mode as shown in FIG. 8 is stored, the printing material suitable for the usage shown in FIG. 5 can be printed by easy operation.

[Modification]

In the above example, as the printing condition in the handwriting mode is set the printing condition capable of restraining the change in attribute such as the size and the color of the stored image data as much as possible. However, in the printing condition in the handwriting mode, more emphasize is put on the printing in the form suitable for scanning after the information such as a sign is added, and a condition allowing the attributes of the stored image data to be changed to some extent may be employed.

For example, it is assumed that a letter having a small size or an image having dense lines is included in the stored image data. In this case, when the printing is performed without changing the attributes of the image data, and the printed original is scanned, the above-described letter or the image may not be scanned properly. As a result, when the stored image data is replaced by the image data obtained by scanning, the information of the above-described letter or the above-described image can be impaired in the image data. Consequently, in MFP 1 according to the modification, in the case where the foregoing portion is included in the stored image data, setting unit 1013 sets increase in magnification as the printing condition in the handwriting mode.

Specifically, setting unit 1013 determines whether or not density of black pixels is higher than a threshold value. As a specific example, for example, setting unit 1013 scans the image data to detect a number of points at each of which a color of a pixel is changed from white to black, and from black to white and to compare the same with a threshold value. Moreover, for example, setting unit 1013 converts the image data to a frequency component to compare a variation width of the frequency with a threshold value. If the density of the pixels is determined to be higher than the threshold value, setting unit 1013 sets the magnification of the printing items to a printing condition making the image data larger in size by a predefined amount than the size when the image data is outputted, for example, by one size.

With the foregoing processing performed in the MFP according to the modification, the printing can be performed so that the magnification is higher, when the letter having a small size, the image having dense lines or the like is included in the image data to be printed. Accordingly, the above-described letter, the above-described image or the like is printed clearly. As a result, when scanning is performed after the information such as a sign is added to the relevant original, the above-described letter, the above-described image or the like is scanned properly, and even when the stored image is replaced, the information can be prevented from being lost.

In the above examples, in the first embodiment, the MFP that performs the processing of replacing the stored image data by the image data obtained by scanning the original to registering the resultant image data has been described, and in the second embodiment, the MFP that performs the processing for printing the image data for use in the foregoing manner has been described. The MFP performing the registration processing described in the first embodiment, and the MFP performing the printing processing described in the second embodiment may be a single MFP, or may be different MFPs. That is, both the types of processing may be performed in the single MFP, or only one type of processing may be performed in one of the different MFPs.

Figure 13:
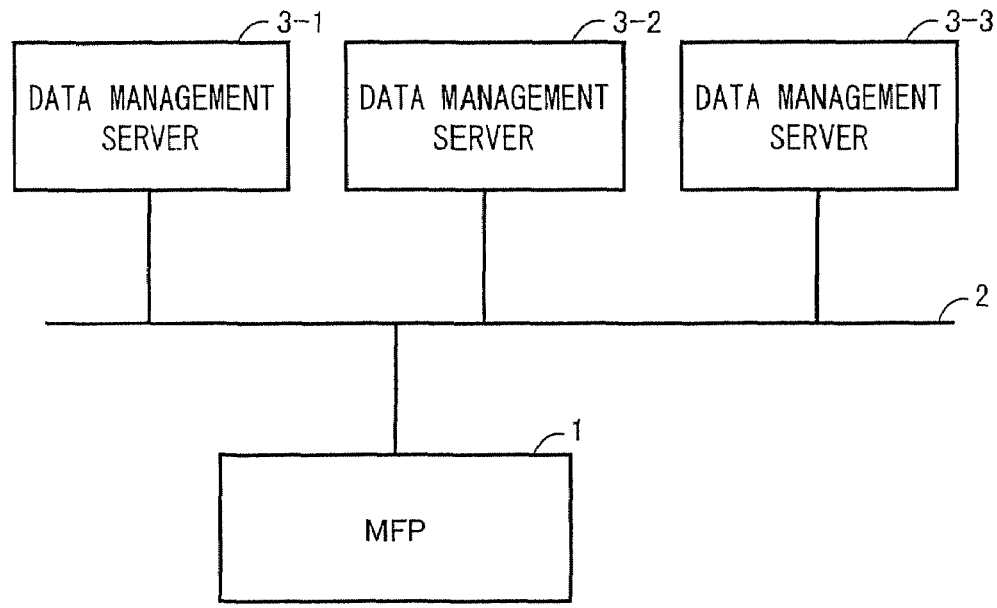
FIG. 13 is a diagram showing a specific example of a system configuration including the MFP, according to the embodiment.
Figure 14:
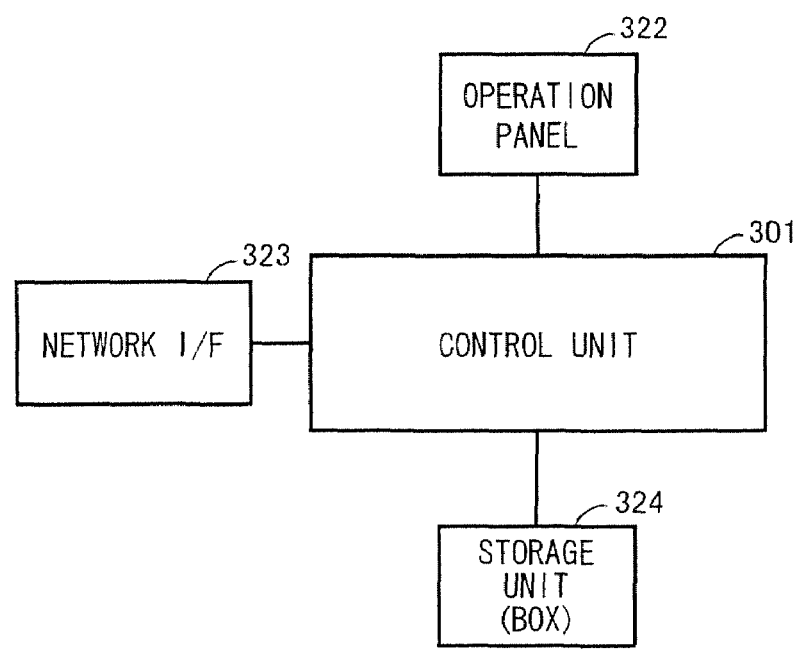
FIG. 14 is a block diagram showing an outline of a control configuration of a data management server included in the system configuration according to the embodiment.

Furthermore, while in any of the above examples, the image data stored in storage unit 124 of MFP 1 is subjected to the printing and the replacement, image data stored in another apparatus connected to the MFP may be subjected to the printing and the replacement. That is, as shown in FIG. 13, MFP 1 may be connected to data management servers 3-1, 3-2, 3-3 (representatively referred to as data management server 3), each of which is another apparatus, through network 2. Data management server 3 includes at least a control unit 301, a storage unit 324, an operation panel 322, and a network I/F 323 as shown in FIG. 14. MFP 1, as in foregoing processing, may print the image data stored in a storage unit (not shown) of data management server 3 in accordance with an instruction from operation panel 122 or the like. At this time, as described before, information indicating a storage location of the above-described image data on above-described storage unit 324 is embedded in the image data as a woven pattern image to be printed. Moreover, at this time, in the case where the handwriting mode is selected as the printing mode, as described before, the printing is performed on a printing condition capable of restraining change in attribute of the stored image data as much as possible, and allowing the printing in a form suitable for the addition of the information such as a sign, or the printing in a form suitable for subsequent scanning to be performed. When the relevant original is scanned to obtain the image data, MFP 1 outputs, to data management server 3 through network 2, the image data obtained by scanning together with a control signal for replacing the image data stored at an address of storage unit 324 of data management server 3, which has been specified from the detected woven pattern image, by the image data obtained by the scanning, and registering the resultant image. Control unit 301 of data management server 3, in accordance with the above-described control signal, replaces the image data stored at the designated address on storage unit 324 by the image data transmitted from MFP 1 and registers the resultant image data. The processing for replacing the stored image data by the image data obtained by scanning and registering the resultant image data in data management server 3, and the processing described in the second embodiment may be both performed in a single MFP, or a plurality of MFPs are included in the above-described system, and these types of processing may be performed in the different MFPs, respectively.

Furthermore, in the case of the above-described processing in MFP 1, or in the case of the configuration shown in FIG. 13, a program for causing the computer to execute the processing in MFP 1 and data management server 3 can also be provided. Such a program can be recorded on a computer-readable recording medium such as a flexible disk, a CD-ROM (Compact Disk-Read Only Memory), a ROM (Read Only Memory), a RAM (Random Access Memory), a memory card and the like, which are attached to the computer, to be provided as a program product. Alternately, the program can also be recorded on a recording medium such as a hard disk incorporated in the computer to be provided. Moreover, by download through network, the program can also be provided.

The program according to the present invention may be a program that calls a necessary module in a predetermined array at predetermined timing among program modules provided as part of an operating system (OS) of the computer to execute the processing. In this case, the program itself does not include the above-described modules, but the processing is executed in cooperation with the OS. Such a program not including the modules can also be included in the program according to the present invention.

Moreover, the program according to the present invention may be a program incorporated in part of another program to be provided. In this case, the program itself does not include modules included in the above-described other program, and the processing is executed in cooperation with the other program. Such a program incorporated in the other program can also be included in the program according to the present invention.

The provided program product is installed in a program storage unit such as a hard disk to be executed. The program product includes the program itself and the recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
   a scanner unit;
   a storage unit that stores image data and a default printing condition for each of a plurality of printing modes;
   a designating unit that receives designation of a particular image data from said storage unit to be processed;
   a receiving unit that receives a printing mode for said image data to be processed;
   a setting unit that sets a printing condition according to which said image data to be processed is printed; and
   a printing unit that prints said image data such that printed material is obtained according to said set printing condition,
   wherein when said scanner unit subsequently scans said printed material with modifications made thereon to generate modified image data and said receiving unit receives a printing mode for said modified image data, said setting unit sets the default printing condition that is associated with said mode set for printing said modified image data and said storage unit replaces said image data stored in said storage unit with said modified image data.

2. The image forming apparatus according to claim 1, wherein as the default printing condition associated with said mode set for printing said modified image data, said setting unit sets at least one printing condition of:
   a first printing condition for printing said image data of one page on one piece of printing paper;
   a second printing condition for performing the printing on only one side of one piece of printing paper;
   a third printing condition for performing the printing without changing a magnification of said image data to be processed;
   a fourth printing condition for performing the printing by designating a paper type of printing paper or a storage unit in which a defined type of paper is stored; and
   a fifth printing condition for performing the printing without changing a number of colors of said image data to be processed.

3. The image forming apparatus according to claim 2 further comprising:
   a first printing condition changing unit that changes a different printing condition to the corresponding printing condition of said first printing condition to said fifth printing condition set in said setting unit when said different printing condition from said first printing condition to said fifth printing condition set in said setting unit is included among printing conditions corresponding to said first printing condition to said fifth printing condition of already set printing conditions.

4. The image forming apparatus according to claim 1,
   wherein as the default printing condition associated with said mode set for printing said scanned modified image data, said setting unit sets at least one printing condition of:
   a sixth printing condition for performing the printing without stapling processing to the printing paper on which said image data to be processed has been printed; and
   a seventh printing condition for performing the printing without punching processing to the printing paper on which said image data to be processed has been printed.

5. The image forming apparatus according to claim 4 further comprising:
   a second printing condition changing unit that changes a different printing condition to the corresponding printing condition of said sixth printing condition and said seventh printing condition set in said setting unit when said different printing condition from said sixth printing condition and said seventh printing condition set in said setting unit is included among printing conditions corresponding to said sixth printing condition and said seventh printing condition of already set printing conditions.

6. The image forming apparatus according to claim 1, wherein, when only particular pages of the modified image data are modified, replacement of said image data stored in said storage unit is performed for only the pages of the image data that correspond to the modified pages of the modified image data.

7. An image forming method including the steps of:
storing, in a storage unit, image data and a default printing condition for each of a plurality of printing modes;
receiving designation of a particular image data, stored in said storage unit, to be processed;
receiving a printing mode for said image data to be processed;
setting a printing condition according to which said image data to be processed is printed;
printing said image data such that printed material is obtained according to said set printing condition; and
scanning said printed material, upon which modifications were made, to generate modified image data,
wherein, when receiving a printing mode for said modified image data to be processed, automatically setting the default printing condition associated with said mode set for processing said modified image data and replacing said image data stored in said storage unit with said modified image data.

8. The image formatting method according to claim 7, wherein when automatically setting the default printing condition that is associated with said mode set for processing said modified image data, at least one of the following printing conditions is set;
a first printing condition for printing said image data of one page on one piece of printing paper;
a second printing condition for performing the printing on only one side of one piece of printing paper;
a third printing condition for performing the printing without changing a magnification of said image data to be processed;
a fourth printing condition for performing the printing by designating a paper type of printing paper or a storage unit in which a defined type of paper is stored; and
a fifth printing condition for performing the printing without changing a number of colors of said image data to be processed.

9. The image forming method according to claim 7, wherein when automatically setting the default printing condition that is associated with said mode set for processing said modified image data, at least one printing condition of the following is set;
a sixth printing condition for performing the printing without stapling processing to the printing paper on which said image data to be processed has been printed; and
a seventh printing condition for performing the printing without punching processing to the printing paper on which said image data to be processed has been printed.

10. The image formatting method according to claim 7 wherein, when only particular pages of the modified image data are modified, replacement of said image data stored in said storage unit is performed for only the pages of the image data that correspond to the modified pages of the modified image data.

11. A non-transitory computer-readable storage medium that stores a program for causing a computer included in an image forming apparatus provided with a printer to execute printing, said program causing said computer to execute the steps of:
storing, in a storage unit, image data and a default printing condition for each of a plurality of printing modes;
receiving designation of a particular image data to be processed;
receiving a printing mode for said image data to be processed;
setting a printing condition according to which said image data to be processed is printed;
printing said image data such that printed material is obtained according to said set printing condition; and
scanning said printed material, upon which modifications have been made, to generate modified image data,
wherein, when receiving a printing mode for said modified image data to be processed, automatically setting the default printing condition that is associated with said mode set for processing said modified image data and replacing said image data stored in said storage unit with said modified image data.

12. The non-transitory storage medium according to claim 11, wherein when automatically setting the default printing condition that is associated with said mode set for processing said modified image data, said program sets at least one printing condition of the following:
a first printing condition for printing said image data of one page on one piece of printing paper;
a second printing condition for performing the printing on only one side of one piece of printing paper;
a third printing condition for performing the printing without changing a magnification of said image data to be processed;
a fourth printing condition for performing the printing by designating a paper type of printing paper or a storage unit in which a defined type of paper is stored; and
a fifth printing condition for performing the printing without changing a number of colors of said image data to be processed.

13. The non-transitory storage medium according to claim 11, wherein when automatically setting the default printing condition that is associated with said mode set for processing said modified image data, said program sets at least one printing condition of the following:
a sixth printing condition for performing the printing without stapling processing to the printing paper on which said image data to be processed has been printed; and
a seventh printing condition for performing the printing without punching processing to the printing paper on which said image data to be processed has been printed.

14. The non-transitory storage medium according to claim 11, when only particular pages of the modified image data are modified, replacement of said image data stored in said storage unit is performed for only the pages of the image data that correspond to the modified pages of the modified image data.

* * * * *